(12) United States Patent
Riddell et al.

(10) Patent No.: US 9,556,849 B2
(45) Date of Patent: Jan. 31, 2017

(54) ATTACHMENT SYSTEM AND METHOD FOR WIND TURBINE VORTEX GENERATORS

(71) Applicant: General Electric Company, Schenectady, NY (US)

(72) Inventors: Scott Gabell Riddell, Greer, SC (US); Michael Christopher Booth, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 13/875,627

(22) Filed: May 2, 2013

(65) Prior Publication Data

US 2014/0328692 A1 Nov. 6, 2014

(51) Int. Cl.
*F03D 1/06* (2006.01)

(52) U.S. Cl.
CPC ........... *F03D 1/0675* (2013.01); *F03D 1/0633* (2013.01); *F05B 2240/122* (2013.01); *F05B 2240/30* (2013.01); *Y02E 10/721* (2013.01); *Y10T 29/49337* (2015.01)

(58) Field of Classification Search
None
See application file for complete search history.

(56) References Cited

U.S. PATENT DOCUMENTS

| RE19,412 | E | 1/1935 | Zaparka |
|---|---|---|---|
| 2,450,440 | A | 10/1948 | Mills |
| 3,528,753 | A | 9/1970 | Dutton et al. |
| 3,586,460 | A | 6/1971 | Toner |
| 4,136,460 | A * | 1/1979 | Cornwall ............... A41H 25/00 33/662 |
| 4,329,119 | A | 5/1982 | Baskin |
| 4,360,871 | A * | 11/1982 | Blaney .................. B29C 53/584 29/889.7 |
| 4,626,172 | A | 12/1986 | Mouille et al. |
| 5,088,665 | A | 2/1992 | Vijgen et al. |
| 5,346,367 | A | 9/1994 | Doolin et al. |
| 7,059,833 | B2 | 6/2006 | Stiesdal et al. |

(Continued)

FOREIGN PATENT DOCUMENTS

| DE | 102012000431 A1 | 7/2013 |
|---|---|---|
| EP | 2444658 A1 | 4/2012 |

(Continued)

OTHER PUBLICATIONS

European Search Report issued in connection with corresponding EP Application No. 14165651.2 dated Sep. 19, 2014.
Related U.S. Appl. No. 13/609,719, filed Sep. 11, 2012.

*Primary Examiner* — Igor Kershteyn
*Assistant Examiner* — Justin Seabe
(74) *Attorney, Agent, or Firm* — Dority & Manning, P.A.

(57) ABSTRACT

A rotor blade assembly for a wind turbine includes a rotor blade having a pressure side, a suction side, a leading edge, and a trailing edge. A vortex generator accessory is mounted to either of the suction side or pressure side and includes a base portion and a protrusion member extending upwardly from the base portion. An attachment layer connects the base portion to the suction or pressure side. The attachment layer has a lower shear modulus than the base portion to allow for shear slippage between the base portion and the underlying suction or pressure side.

6 Claims, 6 Drawing Sheets

(56) References Cited

U.S. PATENT DOCUMENTS

| | | |
|---|---|---|
| 7,458,777 B2 | 12/2008 | Herr |
| 7,637,721 B2 | 12/2009 | Driver et al. |
| 7,927,070 B2 * | 4/2011 | Godsk ................... F03D 1/0633 |
| | | 416/147 |
| 7,976,276 B2 | 7/2011 | Riddell et al. |
| 8,162,590 B2 | 4/2012 | Haag |
| 2007/0065290 A1 | 3/2007 | Herr |
| 2007/0077150 A1 | 4/2007 | Llorente Gonzalez |
| 2009/0074585 A1 | 3/2009 | Koegler et al. |
| 2009/0084932 A1 * | 4/2009 | Livingston ............... B29C 33/38 |
| | | 249/114.1 |
| 2010/0296940 A1 | 11/2010 | Zuteck |
| 2010/0296941 A1 | 11/2010 | Zuteck |
| 2011/0036482 A1 * | 2/2011 | Stenbaek ................ B29C 73/10 |
| | | 156/98 |
| 2011/0100540 A1 * | 5/2011 | Mathew ............. B29D 99/0014 |
| | | 156/245 |
| 2011/0142628 A1 | 6/2011 | Xiong |
| 2011/0142635 A1 | 6/2011 | Fritz |
| 2011/0142668 A1 | 6/2011 | Rao |
| 2011/0268558 A1 | 11/2011 | Driver |
| 2012/0027590 A1 | 2/2012 | Bonnet |
| 2012/0141269 A1 | 6/2012 | Giguere et al. |
| 2012/0151769 A1 | 6/2012 | Brake et al. |
| 2012/0257978 A1 * | 10/2012 | Jensen ................... F03D 1/0608 |
| | | 416/223 R |
| 2013/0045105 A1 | 2/2013 | Driver et al. |

FOREIGN PATENT DOCUMENTS

| | | |
|---|---|---|
| EP | 2484895 A1 | 8/2012 |
| EP | 2532510 A1 | 12/2012 |

* cited by examiner

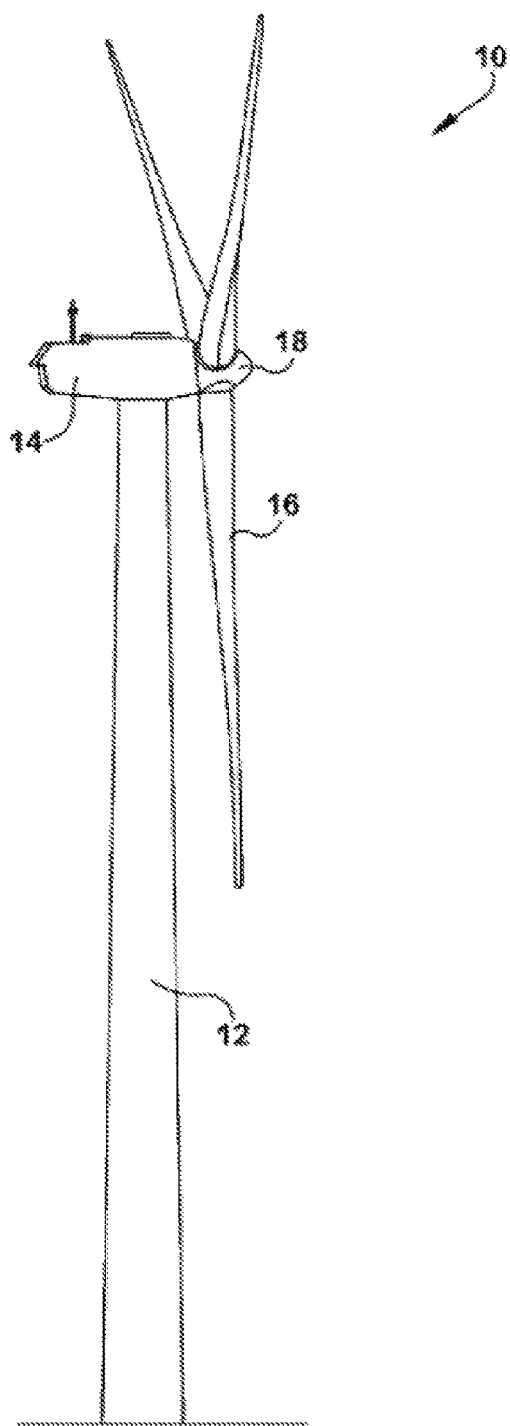
FIG. -1-

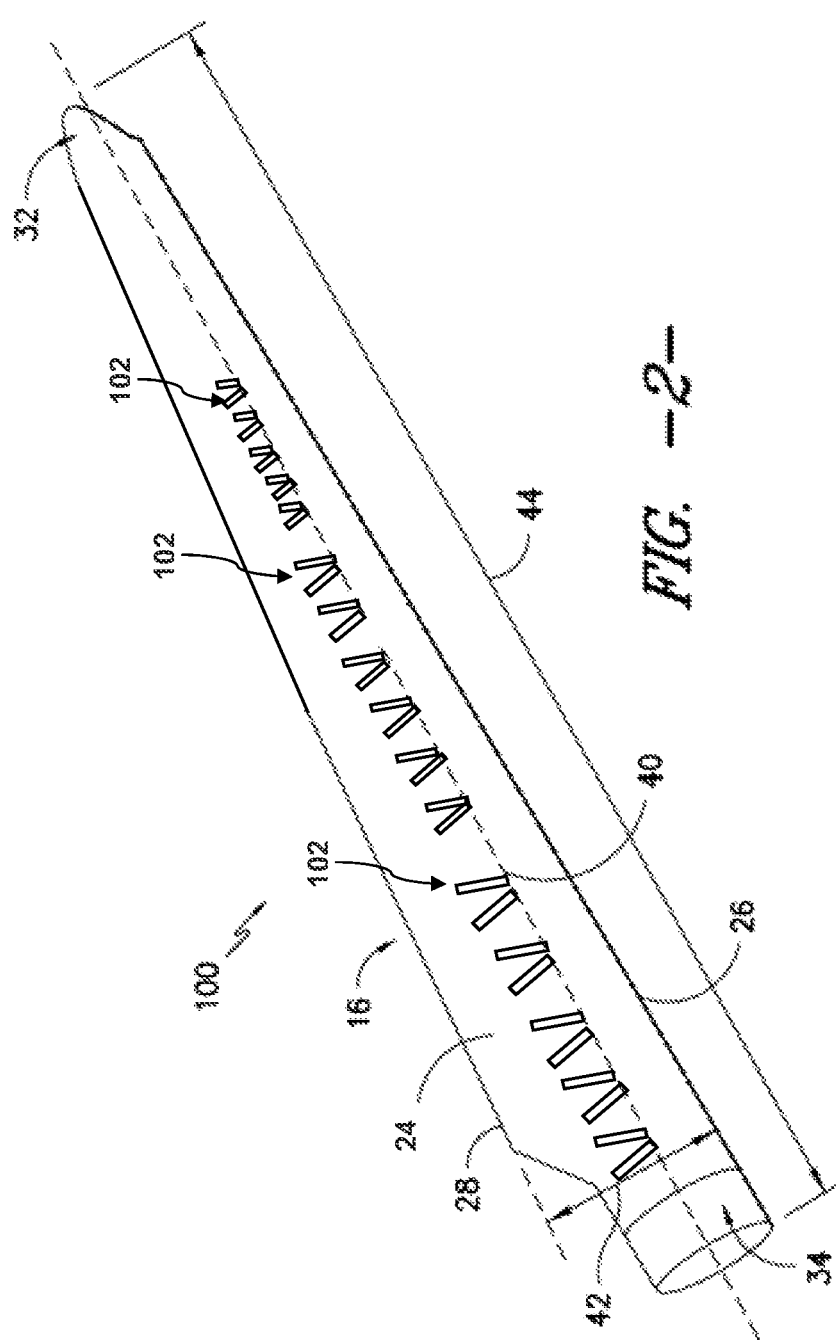
FIG. -2-

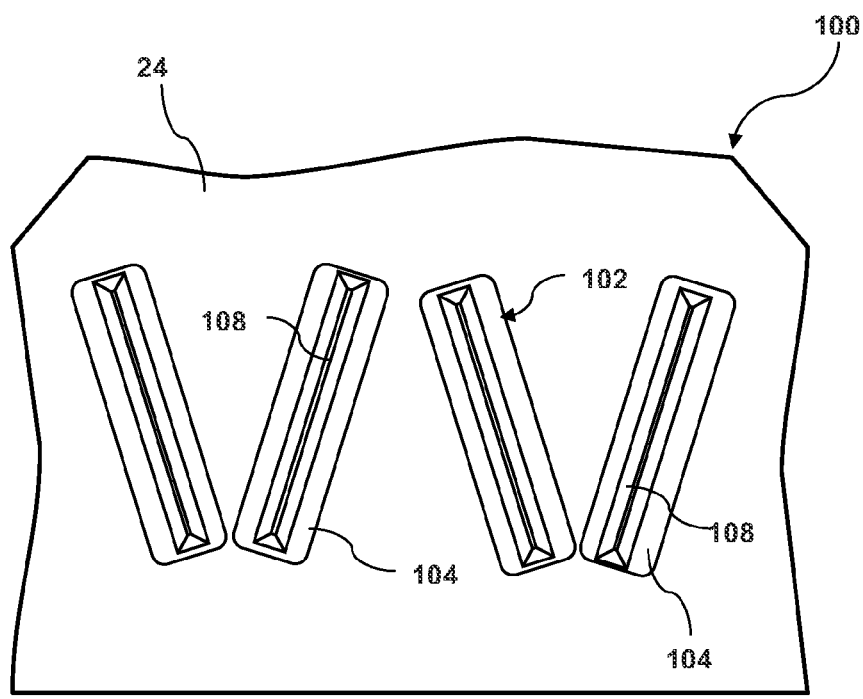
FIG. -3-
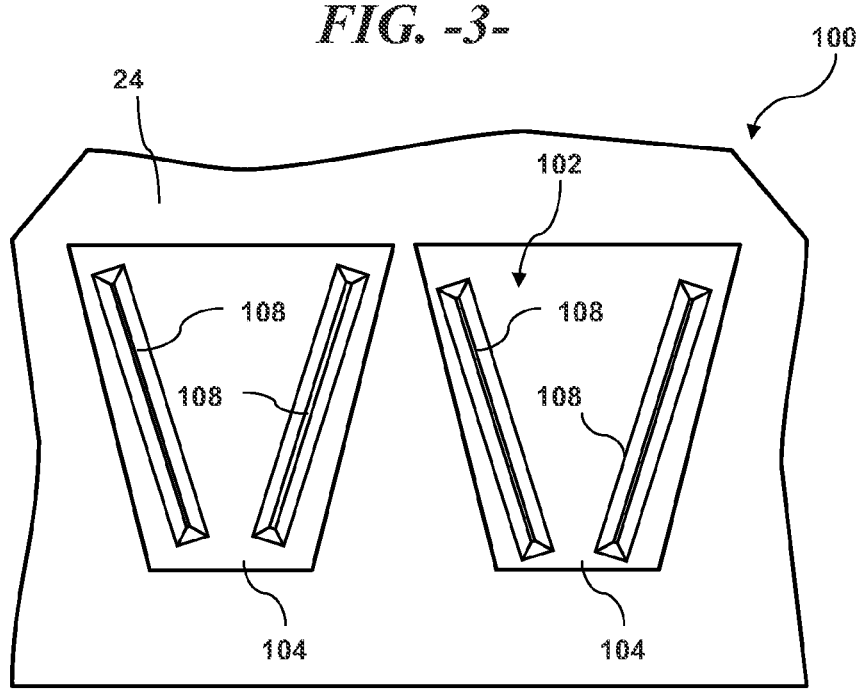
FIG. -4-

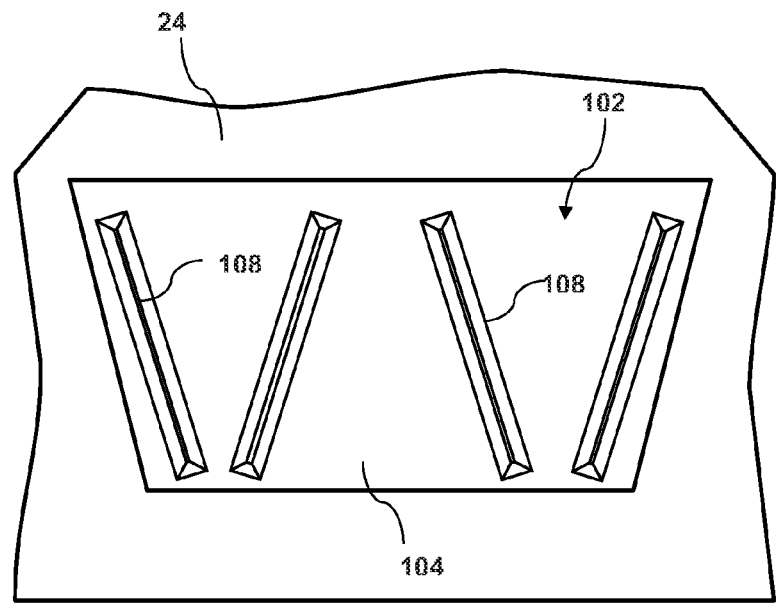
FIG. -5-
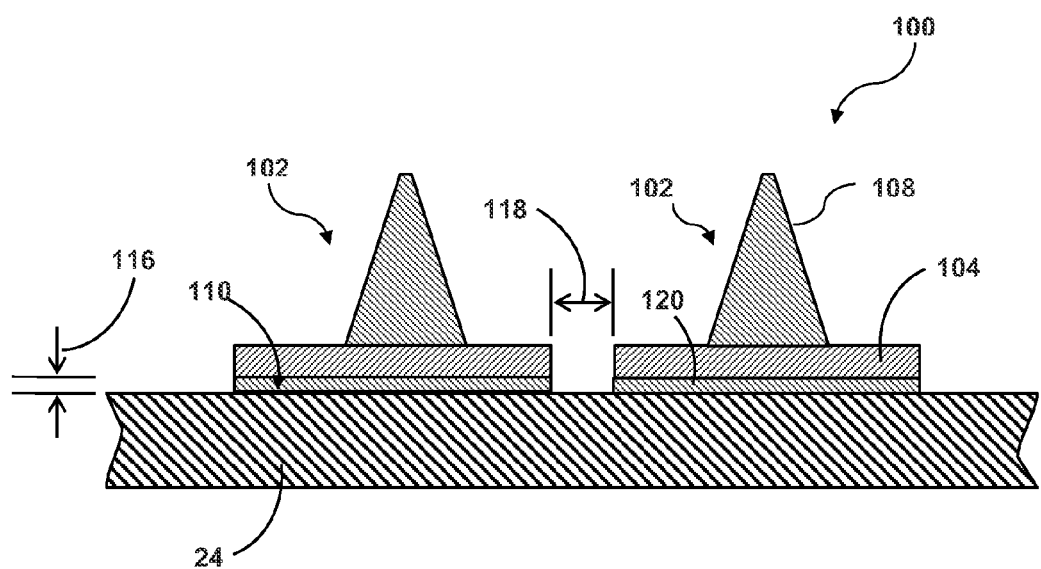
FIG. -6-

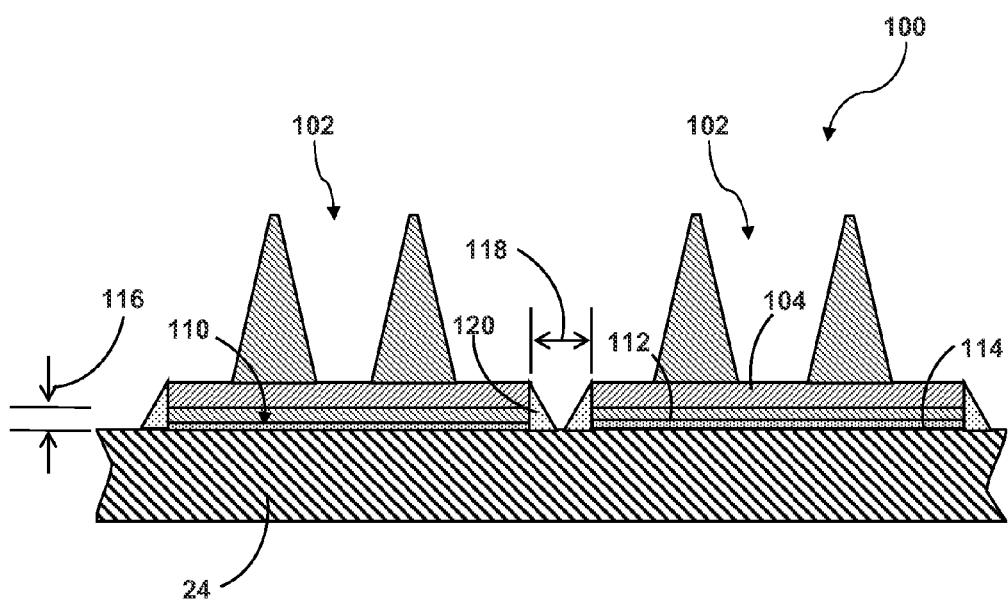
FIG. -7-

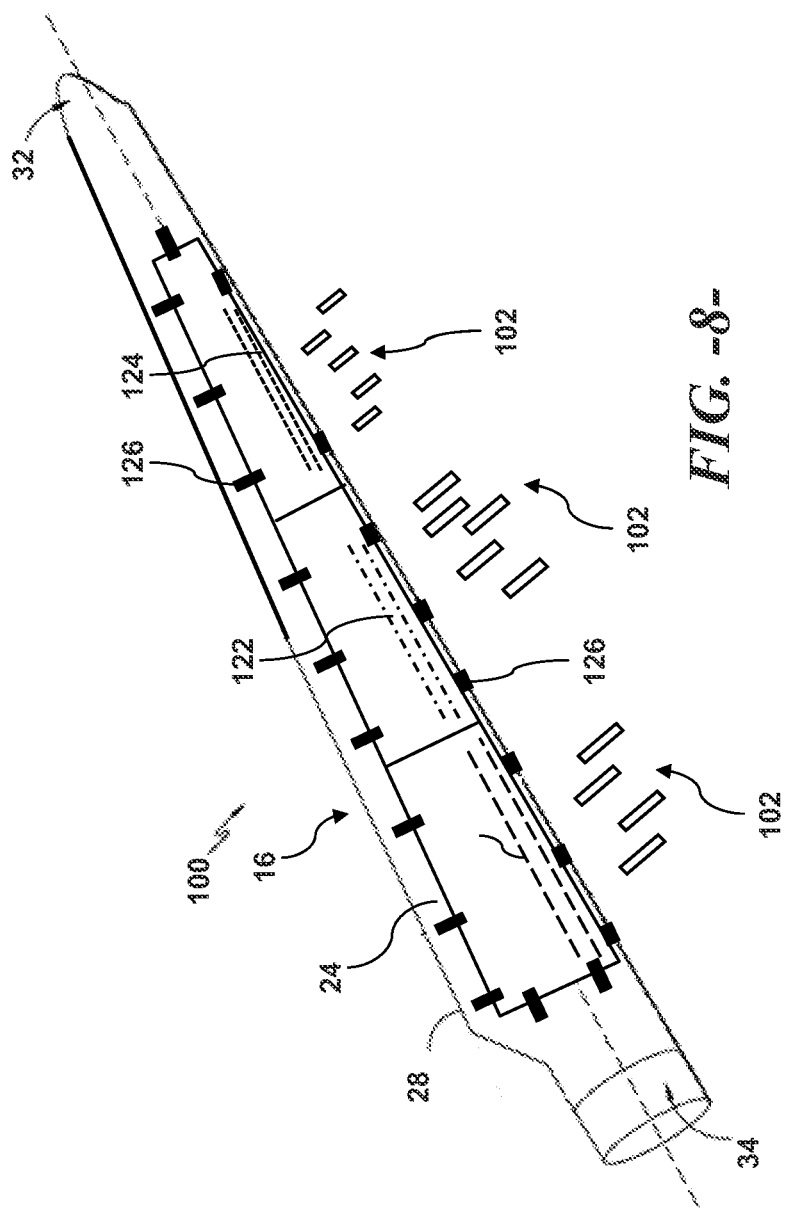

ATTACHMENT SYSTEM AND METHOD FOR WIND TURBINE VORTEX GENERATORS

FIELD OF THE INVENTION

The present disclosure relates in general to wind turbine rotor blades, and more particularly to a system and method for attaching vortex generators to a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures (often referred to as "vortex generators") to the surface of the blade in order to increase the energy conversion efficiency during normal operation of the wind turbine by increasing the lift force of the blades while decreasing the drag force. The vortex generators serve to increase the attached-flow region and to reduce the detached-flow region by moving flow separation nearer the trailing edge of the blade. This is particularly desirable nearer to the blade root in order to increase the overall lift generated by the blade. In particular, the vortex generators create local regions of turbulent airflow over the surface of the blade as a means to prolong flow separation and thus optimize aerodynamic airflow around the blade contour. Conventional vortex generators are typically sheet metal and are defined as "fins" or shaped structures on the suction side of the turbine blade.

The installation techniques and systems for attaching conventional vortex generators can be quite expensive and time consuming, particularly for field installations. For example, typical field installation techniques require the use of attachment fixtures and significant dwell time for curing the attachment adhesives. The adhesives typically are considered hazardous materials and appropriate precautions and protective measures (both equipment and personal) must be taken.

Thus, an improved attachment system for wind turbine rotor blade accessories, particularly vortex generators, would be desired. For example, an attachment system that allows relatively easy, cost-effective, and efficient on-site mounting of vortex generators to a rotor blade without adhesives and attachment fixtures would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine includes a rotor blade having surfaces that define a pressure side, a suction side, a leading edge, and a trailing edge extending between a blade tip and a root. A vortex generator accessory is mounted to either of the suction or pressure sides of the rotor blade and includes a base portion and a protrusion member extending upwardly from the base portion. The protrusion member may be any suitable flow disrupting configuration, such as a fin, or like structure. The invention in its broadest aspects is not limited to any particular shape or configuration of vortex generator or flow disruption protrusion. An attachment layer connects the base portion of the vortex generator accessory to the respective suction or pressure side. This attachment layer has a lower shear modulus than the base portion to allow for shear slippage between the base portion and the underlying suction or pressure side.

In a particular embodiment, the attachment layer comprises a foam-based strip member with adhesive on opposite interface sides thereof. For example, this attachment layer may be Very High Bond (VHB) or SAFT (Solar Acrylic Foam Tape) foam-based strip material.

In certain embodiments, the attachment layer has a thickness between 0.5 mm and 5.0 mm.

The vortex generator accessory may be variously configured. For example, in a particular embodiment, the vortex generator accessory includes a single protrusion member (e.g., a single fin) extending from the base portion. In an alternate embodiment, the vortex generator accessory may include a plurality of the protrusion members extending from a common base portion. In this embodiment, the protrusion members may be arranged in a V-shaped formation on the base portion.

In still a further embodiment, a plurality of the vortex generator accessories are mounted span-wise along the suction or pressure side of the blade, and may be differently shaped or sized depending on their location along the blade. For example, the vortex generator accessories closer to the root end of the blade may have a different size, shape, or configuration than the vortex generator accessories closer to the blade tip. Multiple, separate ones of the vortex generator accessories may be arranged on the blade surface to define an overall vortex generator configuration. For example, pairs of the vortex generator accessories may be configured in V-shaped formations along the suction or pressure side of the blade.

The present invention also encompasses various method embodiments for installing vortex generator accessories to a suction or pressure side of a wind turbine rotor blade, wherein the vortex generator accessories each have a base portion and at least one protrusion member extending upwardly from the base portion. A particular method embodiment includes defining a template that is intended to be attached or placed on the suction or pressure side of the blade on which the vortex generator accessories are to be attached. The template is provided with location positions defined thereon for placement of vortex generator accessories. For example, the template may have a series of holes defined therethrough in a predefined pattern and orientation corresponding to a desired placement and orientation of the vortex generator accessories. The template is aligned and attached to the wind turbine rotor blade such that the location positions are oriented span-wise along the desired suction or pressure side. The template may be taped or otherwise removably attached to any of the blade surfaces for this purpose. The location positions are then marked through the template onto the suction side by any suitable marking means, such as a marker, paint, mechanical device, and so forth. The template is then removed from the wind turbine rotor blade and the vortex generator accessories are attached to the location positions marked on the suction or pressure side of the blade.

In a particular method embodiment, the vortex generator accessories are attached to the suction or pressure side with use of an attachment layer connecting the base portion to the suction or pressure side, with the attachment layer having a lower shear modulus than the base portion to allow for shear slippage between the base portion and the underlying suction or pressure side. For example, the attachment layer may be a foam-based strip member with adhesive on opposite interface sides thereof, such as a Very High Bond (VHB) or SAFT (Solar Acrylic Foam Tape) foam-based strip material.

The template may be variously configured. In a particular embodiment, the template is defined on a sheet member that contours to the wind turbine rotor blade. This sheet may be stored in roll form and subsequently unrolled for placement on the wind turbine blade. In other embodiments, the template may have a more rigid configuration that is pre-shaped to the contours of the wind turbine blade.

The location positions on the template may be designed to provide a leading edge mark and a trailing edge mark for placement of the base portion on the suction or pressure side. These marks may also give a desired angular orientation of the base portion on the blade surface.

In a desirable embodiment, the method for attaching the vortex generator accessories in performed in the field on installed wind turbines.

The method may include mounting the vortex generator accessories in any desired pattern or configuration along the blade. For example, pairs of the vortex generator accessories may be mounted span-wise along the blade surface so as to define V-shaped formations along the suction or pressure side.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a perspective view of one embodiment of a rotor blade assembly of the present disclosure;

FIG. 3 is a partial top view of another embodiment of a rotor blade assembly of the present disclosure;

FIG. 4 is a partial top view of another embodiment of a rotor blade assembly of the present disclosure;

FIG. 5 is a partial top view of still another embodiment of a rotor blade assembly;

FIG. 6 is a cross-sectional view of an embodiment of rotor blade assembly in accordance with aspects of the present disclosure;

FIG. 7 is a cross-sectional view of an alternative embodiment of a rotor blade assembly; and FIG. 8 is a perspective view of components of a rotor blade assembly and template for practice of method embodiments in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade assembly 100 in accordance with aspects of the invention is illustrated. This assembly 100 includes a rotor blade 16 having surfaces defining a pressure side 22 and a suction side 24 extending between a leading edge 26 and a trailing edge 28. The rotor blade 16 may extend from a blade tip 32 to a blade root 34. The surfaces defining the pressure side 22, suction side 24, leading edge 26, and trailing edge 28 further define a rotor blade interior.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flap-wise direction and/or in a generally edgewise direction. The flap-wise direction may generally be construed as the direction (or the opposite direction) in which the aerodynamic lift acts on the rotor blade 16. The edgewise direction is generally perpendicular to the flap-wise direction. Flap-wise curvature of the rotor blade 16 is also known as pre-bend, while edgewise curvature is also known as sweep. Thus, a curved rotor blade 16 may be pre-bent and/or swept. Curving may enable the rotor blade 16 to better withstand flap-wise and edgewise loads during operation of the wind turbine 10, and may further provide clearance for the rotor blade 16 from the tower 12 during operation of the wind turbine 10.

The rotor blade 16 defines a pitch axis 40 (FIG. 2) relative to the rotor hub 18. For example, the pitch axis 40 may extend generally perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40.

The rotor blade 16 defines a chord 42 and a span 44. As shown in FIG. 2, the chord 42 may vary throughout the span 44 of the rotor blade 16. Thus, a local chord may be defined for the rotor blade 16 at any point on the rotor blade 16 along the span 44.

FIG. 2 depicts a plurality of vortex generator accessories 102 located on the suction side 24 along the span aspect of the blade 16. In this particular embodiment, the plurality of vortex generators 102 are configured in pairs to define generally V-shaped formations oriented towards the leading edge 28. In the embodiment illustrated in the figures, the vortex generator accessories 102 are depicted on the suction side surface 224 of the blade 16 for illustrative purposes only. It should be appreciated that the vortex generator accessories 102 could also be provided on the pressure side surface 22.

The vortex generator accessories 102 may be placed at any location on either or both of the blade's flow surfaces 22, 24 wherein it is desired to modify the aerodynamic characteristics of the surface. In a particular embodiment, the vortex generator accessories have a different size and/or configuration depending on their span-wise location on the blade 16. In FIG. 2, there are three groupings of vortex generator accessories 102, with the grouping closest to the blade root 34 being larger (or having an overall different shape or configuration) as compared to the adjacent groupings. In alternate embodiments, all of the vortex generator accessories 102 may be disposed closer to a root portion 34 of the blade as compared to a tip portion 32, or closer to the tip portion 32 as compared to the root portion 34. It should be understood that the invention is not limited to any particular placement of the vortex generator accessories 102 on either or both flow surfaces 22, 24 of the blade 16.

It should also be appreciated that the vortex generator accessories 102 may have different shape configurations within the scope and spirit of the invention, and that the fin-type protrusion depicted in the figures is for illustrative purposes only. Any type of protrusion serving as a flow disrupter for improving the aerodynamic efficiency of the blade is within the scope of the invention.

Embodiments of vortex generator accessories 102 are depicted in FIGS. 3 and 4. Each accessory 102 includes a base portion 104 and a protrusion member 108 extending upwardly from the base portion 104. As mentioned, the protrusion member 108 may be any suitable flow disrupting configuration, such as a fin, or like structure. The invention in its broadest aspects is not limited to any particular shape or configuration of vortex generator or flow disruption protrusion member 108.

The base portion 104 may be defined as a generally continuous plate-like structure that presents a generally flat, planar surface that contours and adheres to the mating blade surface. Functional components, such as the protrusion member 108, may be formed integral with the base portion 104, or separately attached to the base portion 104.

Referring to FIG. 6, an attachment layer 110 connects the base portion 104 of the vortex generator accessory 102 to the respective suction or pressure side. The attachment layer 110 may, in certain embodiments, have a lower shear modulus than the base portion 104 to allow for shear slippage between the relatively stiff base portion 104 and the underlying rotor blade surface 24. It should be appreciated that the properties of the attachment layer will vary depending on numerous factors, such as blade material, blade accessory material, blade size, blade loads, and so forth. For commercial grade wind turbines, the shear modulus is, in certain embodiments, within the range of 50 Kpa-1 MPa. With this unique configuration, the vortex generator accessory 102 is essentially isolated from sheer stresses resulting from stretching of the underlying blade substrate. The intermediate attachment layer 110 allows for relative sheer movement or slippage between the components such that stresses that might otherwise cause cracking or delamination of the accessory 102 are not significantly imparted to the accessory 102.

In a particular embodiment, the attachment layer 110 may be a double-sided adhesive sheet or strip material 112, such as a Very High Bond (VHB)/SAFT (Solar Acrylic Foam Tape) foam-based tape. Various examples of VHB/SAFT foam-based materials are commercially available, for example from 3M Corporation of St. Paul, Minn., USA. The foam attachment layer 112 will sheer a small but defined amount with flexing of the underlying blade surfaces, thus reducing sheer stresses in the vortex generator accessory 102.

The attachment layer 110 may be selected to have a particular thickness 116 (FIG. 6) that provides the desired sheer slippage or strain isolation characteristic without adding a detrimental height aspect that could adversely affect the aerodynamic performance of the blade. For example, the adhesive tape may have a thickness between 0.5 mm and 5.0 mm.

The attachment layer 110 may be applied as a continuous strip between the base portion 104 and underlying blade surface 24, or may be applied in a discontinuous pattern. For example, the attachment layer 110 may include a plurality of distinct strips 112 (e.g., tape or sheet strips) with a chord-wise gap between adjacent strips. In other embodiments, the attachment layer may include span-wise gaps between distinct strips 112.

The length of the vortex generator accessory 102 in combination with the attachment layer 11 is a factor that can be varied to reduce sheer stresses in the accessory 102. For example, for the same type of attachment layer 110, at a certain length the vortex generator accessory 102 may de-bond from the blade surface. In embodiments wherein a plurality of the protrusions 108 are configured on a common base member, such as in the embodiments of FIGS. 4 and 5, it may be advantageous for the base portion 104 to have a span-wise length of between 0.1 meters to less than 2.0 meters, preferably less than 1.0 meters.

FIG. 7 depicts an embodiment wherein the attachment layer 110 includes a layer of resin or putty 114 between the strip/sheet material layer 112 (such as a foam-based layer as described above) and the underlying blade surface. The overall thickness 116 of the attachment layer 110 is preferably within the limits discussed above in this embodiment.

Referring to FIGS. 6 and 7, embodiments are disclosed wherein multiple vortex generator accessories 102 are aligned and attached to the suction side surface 24 with a gap 118 between adjacent base portions 104. Each of the components base portions 104 may have a length of between 0.1 meters to less than 2.0 meters. Each of the base portions 104 has a respective attachment layer 110 that does not span the gap 118. Thus, the gaps 118 allow for relative sheer slippage between the different base portions 104. Fillet seals 120 may be provided at the edges of the respective base portions 104 to protect the attachment layer 110 from moisture or other elements. The seals 120 may be, for example, any type of flexible caulking material.

Referring to the figures in general, the vortex generator accessories include one or more flow disruption protrusion members 108 extending upwardly from the base portion 104. In the embodiment of FIG. 3, a single protrusion member 108 extends from each respective base portion 104. In an alternate embodiment depicted in FIG. 4, a plurality of the protrusion members 108 extend from a common base portion 104. The protrusion members 108 may be configured on the common base portion 104 in any desired pattern, such as the V-shaped formation depicted in FIG. 4.

FIG. 5 depicts another embodiment wherein multiple protrusion members 108 are configured on a common base portion. In this embodiment, pairs of the protrusions 108 are arranged to form multiple V-shaped formations on a common base portion 104.

In the embodiment of FIG. 3, multiple, separate vortex generator accessories 102 having a single fin-like protrusion member 108 are arranged on the blade surface 24 to define an overall vortex generator configuration along the span-wise aspect of the blade, as depicted in FIG. 2. For example, pairs of the vortex generator accessories 102 may be configured in V-shaped formations along the suction or pressure side of the blade.

The present invention also encompasses various method embodiments for installing vortex generator accessories 102 to a suction 24 or pressure side 22 of a wind turbine rotor blade 16, wherein the vortex generator accessories 102 each have a base portion 104 and at least one protrusion member 108 extending upwardly from the base portion 104, as described above. Referring to FIG. 8, a particular method embodiment includes defining a template 122 that is intended to be attached or placed on the suction or pressure side of the blade on which the vortex generator accessories 102 are to be attached. The template 122 is provided with location positions 124 defined thereon for placement of vortex generator accessories 102. For example, the template may have a series of holes defined therethrough in a predefined pattern and orientation corresponding to a desired placement and orientation of the vortex generator accessories 102 on the blade surface 24. The location positions 124 may be designed to provide a leading edge mark and a trailing edge mark for placement of the base portion on the suction or pressure side, wherein the leading edge and trailing edge of the base portion 104 is aligned with the leading and trailing edge marks made on the blade surface through the template. These marks may also give a desired angular orientation of the base portion on the blade surface.

The template 122 may be variously configured. In a particular embodiment, the template 122 is defined on a sheet member that contours to the wind turbine rotor blade 16. This sheet may be stored in roll form and subsequently unrolled for placement on the wind turbine blade 16 via suitable means, such as tape 126 illustrated in FIG. 8. A releasable adhesive or mechanical attachment means may also be utilized. It may be desired to wrap the template 122 around either of the leading edge 26 or trailing edge 28, or to attach the template 122 without wrapping around either edges 26, 28, as depicted in FIG. 8.

In other embodiments, the template 122 may have a more rigid configuration that is pre-shaped to the contours of the wind turbine blade 16. For example, the template 122 may be a pre-formed shell member that fits onto the blade 16, for example with edge configurations that snap or otherwise fit over the leading and/or trailing edges 26, 28 of the blade 16.

The template 122 is aligned and attached to the rotor blade surface 24 such that the location positions 124 are oriented span-wise along the desired suction or pressure side. Desirably a mark on the template 122 is aligned with structure on the blade 16 to ensure proper location and orientation of the template 122. For example, marks on the template 122 may align with marks on the blade surface 24 corresponding to the known pitch axis 40. As mentioned, the template 122 may be taped or otherwise removably attached to any of the blade surfaces for this purpose. The location positions 124 are then marked through the template 122 onto the suction side 24 by any suitable marking means, such as a marker, paint, mechanical device, and so forth. The template 122 is then removed from the wind turbine rotor blade 16 and the vortex generator accessories 102 are attached to the location positions 124 marked on the suction 24 or pressure side 22 of the blade in the manner described above.

The method embodiments of the present invention are advantageous in that the vortex generator accessories 102 may be attached to existing wind turbine blades in the field without detaching the rotor blades from the hub.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing vortex generator accessories to a suction or pressure side of a wind turbine rotor blade, wherein the vortex generator accessories each have a base portion and at least one protrusion member extending upwardly from the base portion, the method comprising:

defining a template with location positions defined thereon for placement of vortex generator accessories, the template being defined on a flexible sheet member that contours to the wind turbine rotor blade when placed along the suction or pressure side;

unrolling the flexible template from roll form onto the wind turbine rotor blade along the suction or pressure side;

wrapping the flexible template around either of the leading edge or trailing edge of the wind turbine rotor blade;

securing the flexible template to the wind turbine rotor blade such that the location positions are oriented span-wise along the suction or pressure side;

marking the location positions through the template onto the suction side or pressure side, wherein the location positions define a leading edge mark and a separate trailing edge mark made through the template for placement of the base portion on the suction or pressure side;

completely removing the template from the wind turbine rotor blade; and attaching the vortex generator accessories to the location positions marked on the suction or pressure side of the wind turbine rotor blade by aligning a leading edge and a trailing edge of the vortex generator to the separate leading and trailing edge marks made on the suction side or pressure side.

2. The method as in claim 1, wherein the vortex generator accessories are attached to the suction or pressure side with use of an attachment layer connecting the base portion to the suction or pressure side, the attachment layer having a lower shear modulus than the base portion to allow for shear slippage between the base portion and the underlying suction or pressure side.

3. The method as in claim, 2 wherein the attachment layer comprises a foam-based strip member with adhesive on opposite interface sides thereof.

4. The method as in claim 3, wherein the vortex generator accessories comprise a plurality of the protrusion members extending from the base portion.

5. The method as in claim 4, wherein the protrusions members are arranged in a V-shaped formation on the base portion.

6. The method as in claim 3, wherein pairs of the vortex generator accessories are mounted span-wise along the blade so as to define V-shaped formations along the suction or pressure side.

* * * * *